UNITED STATES PATENT OFFICE.

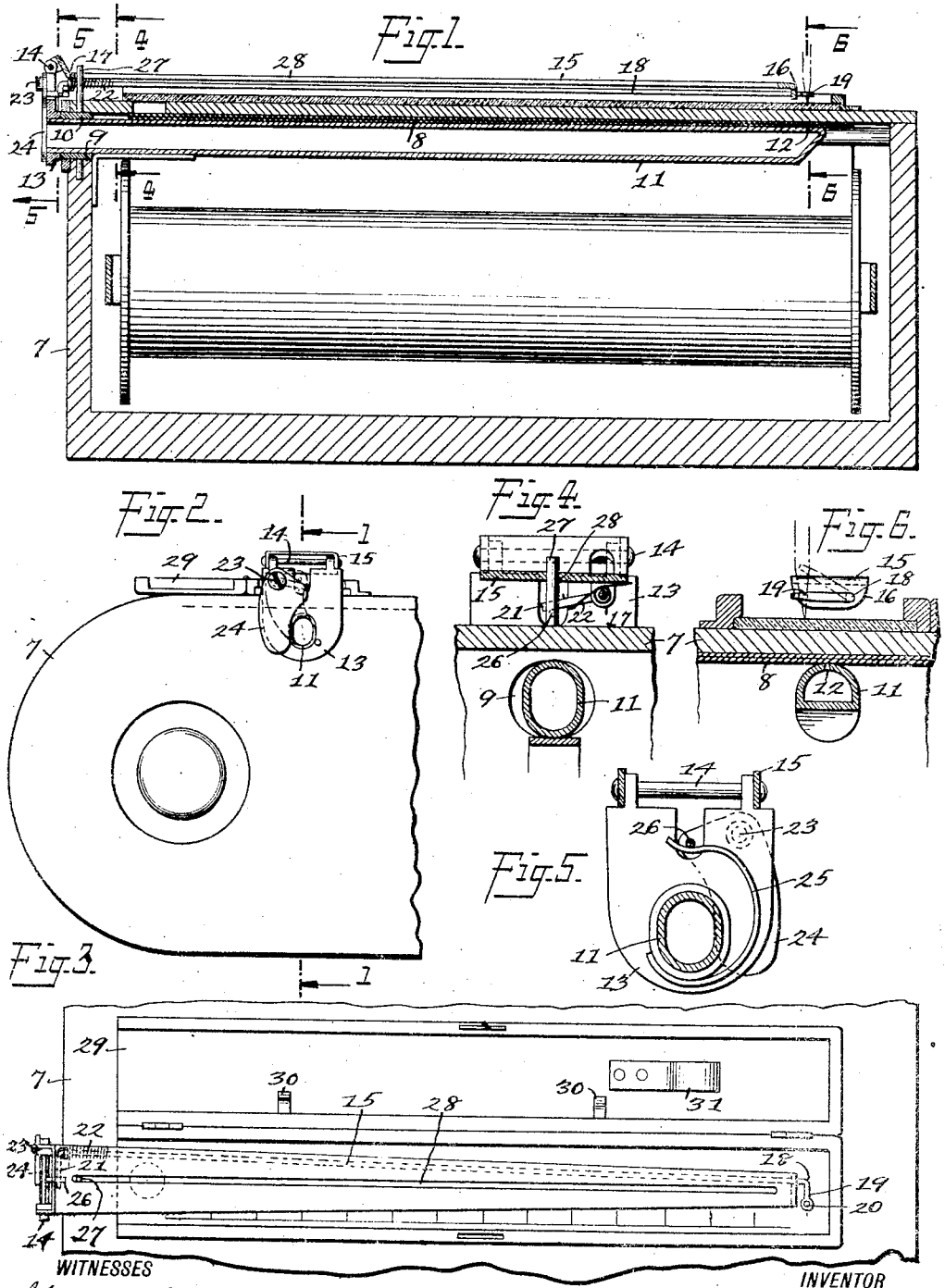

ALONZO F. KELLOGG, OF PORTAGE, WISCONSIN.

CAMERA.

1,162,240.  Specification of Letters Patent.  Patented Nov. 30, 1915.

Application filed February 10, 1915. Serial No. 7,271.

*To all whom it may concern:*

Be it known that I, ALONZO F. KELLOGG, a citizen of the United States, and a resident of Portage, in the county of Columbia and State of Wisconsin, have invented certain new and useful Improvements in Cameras, of which the following is a specification.

My invention relates to cameras, and is an improvement over the construction shown and described in my application for Letters Patent of the United States bearing date of September 10, 1914, Serial No. 861,029, in which is shown an exposure identification device comprising a light carrying tube provided with an aperture adapted to be moved exteriorly of the camera to produce suitable identification marks upon the exposures.

My improvement consists of a shutter for excluding the light from said tube when the device is not in use and means for automatically opening said shutter when the device is in use, through the medium of a pencil or stylus the movements of which are duplicated by the light carrying tube.

My invention is fully described in the following specification, of which the accompanying drawings form a part, in which like reference characters refer to like parts in each of the views, and in which:—

Figure 1 is a section taken through a camera provided with my invention, on the line 1—1 of Fig. 2; Fig. 2 is an edge view of a portion of the camera and an end view of my device thereon; Fig. 3 is a fragmentary plan view of the camera with my attachment thereon; Fig. 4 is a section taken on the line 4—4 of Fig. 1; Fig. 5 is a section taken on the line 5—5 of Fig. 1; and Fig. 6 is a section taken on the line 6—6 of Fig. 1.

In the drawings forming a part of this application I have shown a present preferred form of embodiment of my invention applied to a camera 7 having a sensitized element 8 therein, such as the usual roll film, cut films, or plates.

The camera is provided with an opening at one edge and end, as shown at 9, Figs. 1 and 4, in which is pivoted a collar or sleeve 10 through which a tube 11 is slidably arranged, said tube being open at its outer end and closed at its inner end and provided with an aperture 12.

Secured to the outer end of the tube 11 is a collar 13 having upwardly directed arms thereon for carrying a pivot pin 14 for an arm 15 arranged parallel to and slightly above the surface of the camera; by means of this construction, the arm 15 may be moved over the surface of the camera, as set forth in the application referred to, thereby moving the inner end of the tube 11 in a complemental manner.

Rotatably held in lugs 16 and 17 of the arm 15 is a rod 18 which projects beyond the free end of said arm and is bent angularly as shown at 19, Figs. 3 and 6, the angular extension or offset thus resulting being perforated at 20 to allow the passage of the point of a pencil, pen, or stylus with which the desired identifying characters are formed upon the outer surface of the camera. The inner end of said rod is similarly bent at 21 and is provided with a coil-spring 22 which serves to maintain the offsets 19 and 21 in raised positions, as indicated by dotted lines in Fig. 6 but, when the offset 19 is depressed by means of a pencil or stylus, the offset 21 is likewise depressed, against the action of the spring 22.

Pivoted to the collar 13, at 23, is a shutter 24 which normally covers the open end of the tube 11, being shown in open position in full lines and in closed position by dotted lines in Fig. 2, a spring 25, Fig. 5, being provided to maintain the shutter in closed position or to move it thereto if moved therefrom. The spring 25 bears against a pin 26 secured to the inner surface of the shutter and projected into the path of downward movement of the offset 21 of the rod 18, this offset movement serving to open the shutter against its spring.

It will thus be seen that, when a pencil or stylus is passed through the perforation 20 and forced downward to form characters therewith, as in writing, the shutter is opened and light is admitted to the sensitized element through the perforation 12 to affect the emulsion on said element whereby it will show black on the developed negative and white on the print made therefrom; when, in the formation of said characters, the pressure is released from the offset 19, the shutter closes through the medium of its spring, said shutter being thus automatically actuated and admitting light to the sensitized element only for the formation of the desired characters.

The pivot 27 of the sleeve 10 projects above the plane of and through a slot 28 in the arm 15, thereby serving as a pivot for said arm to prevent torsional movement thereof with respect to its support. I may, if desired, provide a suitable scale beneath the arm 15 and a cover 29 therefor, said cover being shown as provided with clips 30 for a pencil or stylus and with a spring 31 adapted to bear against the arm 15 to maintain the same in position. This last named feature is, however, made the basis of another application for patent.

As will be obvious, I do not limit myself to the exact details of construction shown and described, but may make alterations thereover, within the scope of the following claims, without departing from the spirit of my invention or sacrificing its advantages.

Having fully described my invention, what I claim as new, and desire to secure by Letters Patent, is:—

1. The combination with a camera having a sensitized film therein; of a movable arm pivoted upon said camera, a tube open at its outer end and closed at its inner end and having an aperture adjacent said film, means for insuring complemental movement of said arm and tube, a shutter for said open end, and means operable by a pencil or stylus employed for moving said arm and tube for opening said shutter.

2. In a device of the class described, an open ended tube, an arm for moving the same, a shutter for said open end and normally cloing the same, means at the outer end of said arm for receiving and holding a pencil or stylus, and means operable by the pressure of said pencil or stylus for opening said shutter.

3. In a device of the class described, an open ended tube, an arm for moving the same, a shutter for said open end and normally closing the same, a rod pivoted to said arm and provided with an offset at each end thereof, the outer one of which is adapted to receive a pencil or stylus, and means in operative connection with said rod for opening said shutter upon pressure applied to said pencil or stylus.

In testimony whereof I have signed my name to this specification in the presence of two subscribing witnesses.

ALONZO F. KELLOGG.

Witnesses:
C. H. HALL,
A. C. KELLOGG.